(12) United States Patent
Voves

(10) Patent No.: US 7,997,607 B2
(45) Date of Patent: Aug. 16, 2011

(54) MODULAR MULTI-FUNCTIONAL CARGO CARRIER AND TRANSPORT TRAILER

(75) Inventor: Mark A. Voves, Cresco, IA (US)

(73) Assignee: Innovations Unlimited, L.L.C., Cedar Rapids, IA (US)

( * ) Notice: Subject to any disclaimer, the term of this patent is extended or adjusted under 35 U.S.C. 154(b) by 189 days.

(21) Appl. No.: 11/966,349

(22) Filed: Dec. 28, 2007

(65) Prior Publication Data

US 2008/0231017 A1    Sep. 25, 2008

Related U.S. Application Data

(60) Provisional application No. 60/918,681, filed on Mar. 19, 2007.

(51) Int. Cl.
*B62D 53/00*    (2006.01)

(52) U.S. Cl. .................. 280/408; 280/491.1; 280/416.1

(58) Field of Classification Search ............... 280/408, 280/491.1
See application file for complete search history.

(56) References Cited

U.S. PATENT DOCUMENTS

| | | | | |
|---|---|---|---|---|
| 5,607,176 | A * | 3/1997 | Leib et al. | 280/656 |
| 6,199,894 | B1 * | 3/2001 | Anderson | 280/638 |
| 6,273,447 | B1 * | 8/2001 | Vande Berg | 280/476.1 |
| 7,547,179 | B1 * | 6/2009 | Edmonson | 414/563 |
| 2004/0239073 | A1 * | 12/2004 | Goettker | 280/491.1 |
| 2005/0046167 | A1 * | 3/2005 | Lin | 280/785 |
| 2005/0104323 | A1 * | 5/2005 | Thurm | 280/491.1 |
| 2005/0104324 | A1 * | 5/2005 | Richard et al. | 280/491.1 |

* cited by examiner

*Primary Examiner* — Tony H. Winner
*Assistant Examiner* — Jacob Knutson

(57) ABSTRACT

A recreational trailer assembly that includes first and second trailer members and a trailer tongue that are all detachably and removably connected to one another. Specifically the first and second trailer members and trailer tongue are detachably removed from one another allowing for multi-functional uses of each and to provide assistance in transportation and storage of the entire recreational trailer assembly.

6 Claims, 6 Drawing Sheets

MODULAR MULTI-FUNCTIONAL CARGO CARRIER AND TRANSPORT TRAILER

CROSS REFERENCE TO RELATED APPLICATION

This application claims the benefit of U.S. Provisional Application No. 60/918,681 filed Mar. 19, 2007.

BACKGROUND OF THE INVENTION

This invention relates to recreational trailers. More specifically this invention relates to a multi-piece recreational trailer.

In the United States and internationally the use of off-road vehicles has increased substantially since the 3-wheeled recreational vehicle emerged in the 1970's as a utility and sport vehicle. Safety issue concerns caused the emergence of the 4-wheeler or "quad" market and this safer recreational vehicle version increased the popularity of off-road vehicles. For references within this application, recreational off-road vehicles will be referred to as all terrain vehicles or ATV's. The marketplace has also emerged for multi-purpose or utility tractors since the 1970's. Today, the average middle income and higher class consumers within the United States have either an ATV or utility tractor of some sort for their household or recreational use.

The recreational trailer market in the United States continues to grow as the use of ATV's and utility vehicles increases. Common purposes of the trailer not only include transporting the ATV for recreational use but also using trailers for many tasks around the house, farm, or ranch such as gardening, landscaping, hauling, and the like.

Rear cargo carrier sales also continue to rise in the United States with the popular and easy hitch method of attachment. This inexpensive device is great for substantially increasing the amount of cargo or supplies that any vehicle can hold. Cargo carriers help transform the average car or sports utility vehicle into a truck and give the ability to haul larger than normal for these vehicles. Rear cargo carriers also can be used behind ATV's or utility vehicles. These rear cargo carriers do store easier than a trailer (can be stored vertically against a wall versus needing space for the whole trailer) which is a benefit for the urban individual that has limited storage space.

Therefore, a principal object of the present invention is to provide a vehicle-attaching transporting device that will overcome the deficiencies of the prior art devices.

Another object of the present invention is to provide a vehicle-attaching transporting device that provides multiple task application and configuration options.

Yet another object of the present invention is to provide a vehicle-attaching transporting device that can be easily assembled/disassembled and stored.

These and other objects, features or advantages of the present invention will become apparent from the specification and claims.

BRIEF SUMMARY OF THE INVENTION

A recreational trailer assembly for hauling. The recreational trailer assembly includes a first trailer member that has a bed extending from a first end to a second end and an underside having a frame secured thereto. A trailer tongue is removably connected to the frame and extends from the frame past the first end of the first trailer member to attach to a vehicle. The underside of the first trailer additionally has an axle and wheels for transportation. Detachably connected to the second end of the first trailer member is a second trailer member that also has a bed that extends from a first end to the second end such that when the first and second trailer members are attached they form the recreational trailer.

DETAILED DESCRIPTION OF A PREFERRED EMBODIMENT OF THE INVENTION

Figure 1:
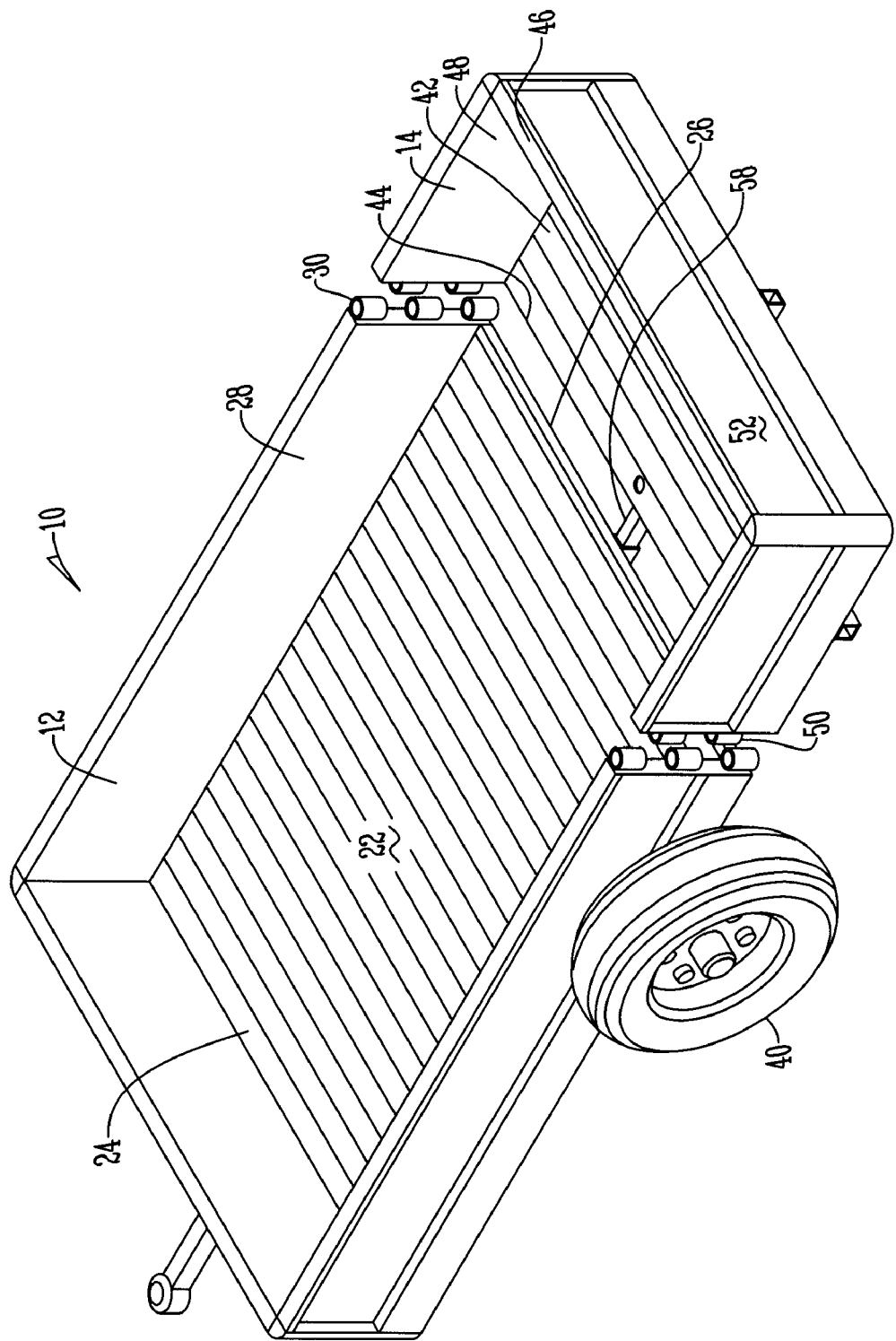
FIG. 1 is a perspective view of a recreational trailer assembly.
Figure 2:
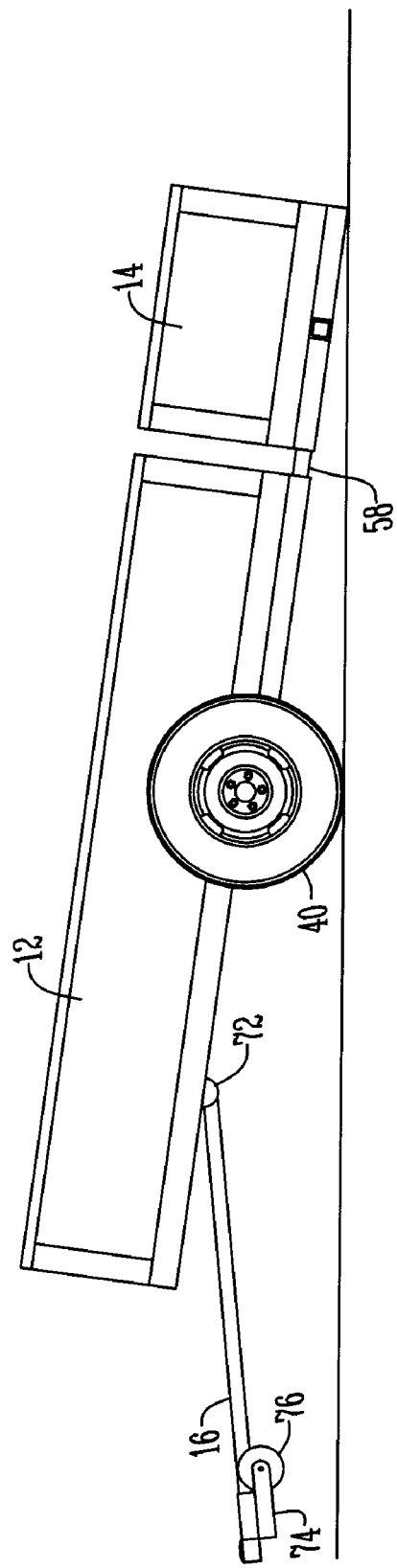
FIG. 2 is a perspective view of a tilted recreational trailer assembly.
Figure 3:
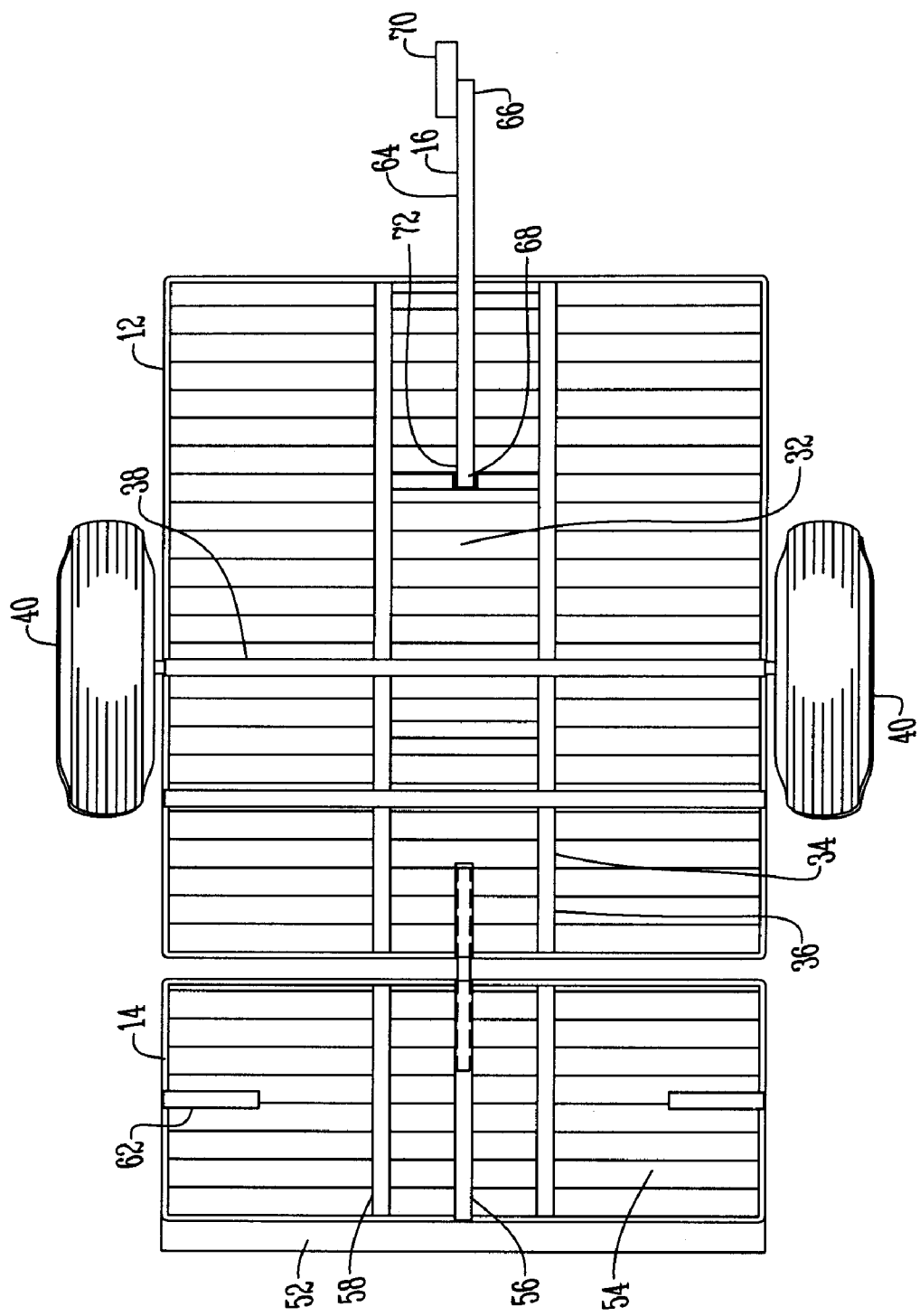
FIG. 3 is bottom perspective view of a recreational trailer assembly.

FIGS. 1-3 show a recreational trailer assembly 10. The recreational trailer assembly 10 is comprised of first and second trailer members 12 and 14 that are used in association with a plurality of removable implements such as trailer tongue 16, a light bar 18 and dolly bar 20 to arrive at different arrangements of the recreational trailer assembly 10. Specifically the first trailer member 12 can be considered a first configuration, a sub-trailer, a utility trailer, a transport trailer or the like whereas the second trailer member can be considered a second configuration, cargo carrier, or the like.

The first trailer member 12 has a bed 22 that extends from a first end 24 to a second end 26. In a preferred embodiment the bed 22 is made of ribbed aluminum. In alternative embodiments the bed 22 can be made from steel, wood or the like without falling outside the scope of this disclosure. Optionally the bed 22 has a sidewall 28 disposed around its perimeter wherein the sidewall 28 terminates at the second end 26 in a connection mechanism 30. In the embodiment of FIGS. 1-3 the sidewall 28 does not extend traversely across the second end 26 of the first trailer member 12.

The first trailer member 12 additionally has an underside 32 that is typically the opposite side of the bed 22. The underside 32 is secured to a frame 34 that contains a plurality of sub-frame members 36. Secured to the frame 34 is an axle 38 that is rotatably connected to a pair of wheels 40.

The second trailer member 14 similar to the first trailer member 12 has a bed 42 extending from a first end 44 to a second end 46. Additionally the bed 42 is preferably made of ribbed aluminum. Also similar to the first trailer member 12, the second trailer member 14 optionally has a sidewall 48 extending around its perimeter that terminates in a connection mechanism 50 at the first end 44. In the embodiment of FIGS. 1-3 the sidewall does not extend traversely across the first end 44 of the second trailer member 14. Additionally, sidewalls 28 and 48 may be detachable side rails that can be purchased separately and placed into the first and second trailer members 14 and 16.

The connection mechanism 50 of the second trailer member 14 matingly engages with the connection mechanism 30 of the sidewall 28 of the first trailer member 12 to provide a detachable connection. In a preferred embodiment the connection mechanisms 30 and 50 are hinges having eyelets wherein the eyelets align such that a pin may be disposed through the eyelets similar to that of a door hinge to provide the detachable connection therebetween. While described preferably as hinges and eyelets, the connection mechanisms 30 and 50 can be of any type such as snaps, tongue and groove or the like. Similarly, while described as part of sidewalls 28 and 48, the connection mechanisms 30 and 50 could be part of the bed 22 or at different locations as long as they connect the first and second trailer members 12 and 14 together.

Additionally optionally at the second end 46 of the second trailer member 14 is a retractable tailgate 52. The tailgate 52 facilitates driving vehicles such as ATV's and lawn tractors onto the recreational trailer assembly 10.

The second trailer member 14 also has an underside 54 that typically is the underside of the bed 42. Secured to the underside 54 is a frame 56 that is comprised of a plurality of sub-frame members 58. As best shown in FIG. 1 a centrally located sub-frame member 58 extends from the frame 56 past the first end 44 of the second trailer member 14 such that this sub-frame member 58 can be disposed within a centrally located sub-frame member 36 of the first trailer member 12. By being disposed within the sub-frame member 36 of the first trailer member 12, the centrally located sub-frame member 58 of the second trailer member 14 provides both an additional detachable connection between the first and second trailer members 12 and 14 and aligns the sidewalls 28 and 48 to provide a detachable connection.

The second trailer member 14 further has an opening at its second end 46 such that the second trailer member 14 may receive and detachably connect to the light bar 18 or dolly bar 20 when desired. Specifically when connected to the light bar 18 an electrical connection is provided from the vehicle (not pictured) that is hauling the recreational trailer assembly 10 to the light bar 18 via the recreational trailer assembly 10 to provide power to the light bar 18.

Figure 4:
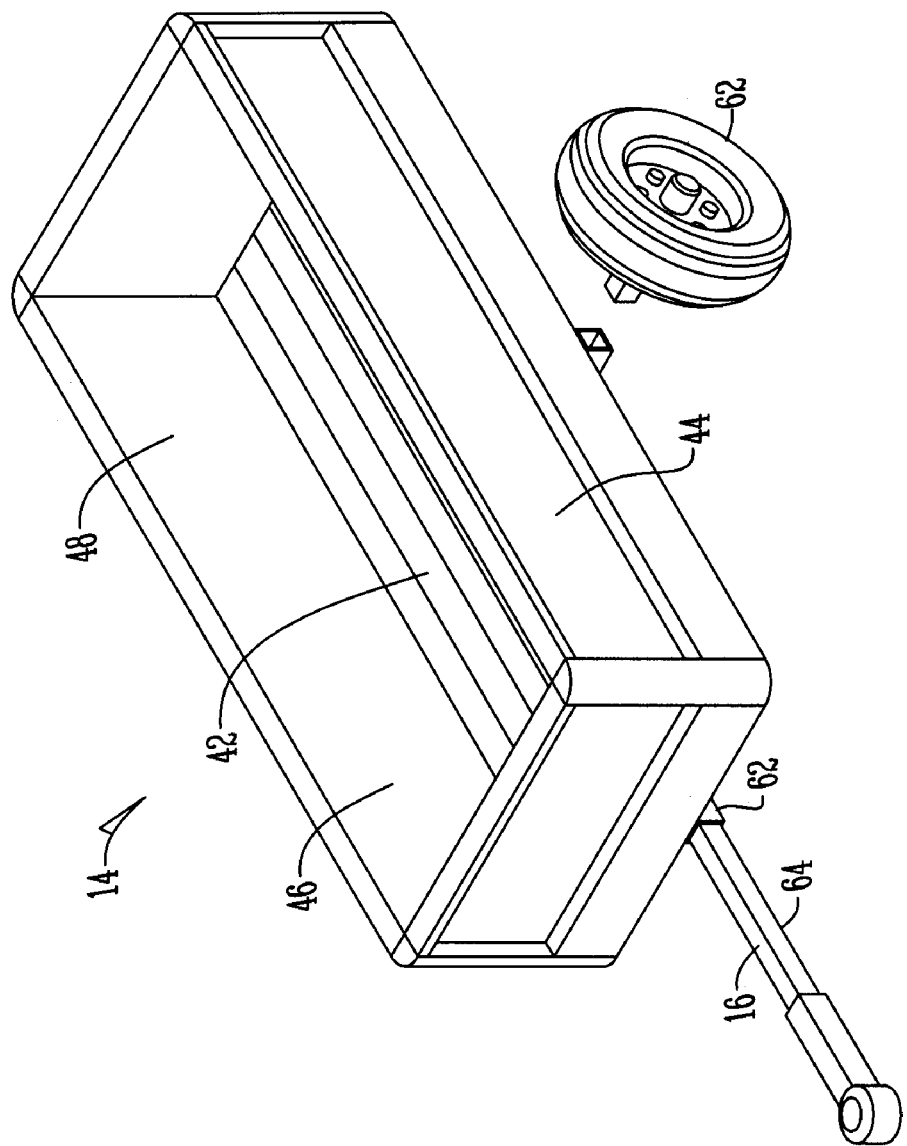
FIG. 4 is a perspective view of a trailer member of a recreational trailer assembly.

The second trailer member 14 may be directly connected to a vehicle when items being hauled are only of size and shape to fit into second trailer member 14. Specifically, this embodiment is best shown in FIG. 4 and in this embodiment sidewall 48 extends around the entire parameter of the bed 42 of the second trailer member 14.

Figure 5:
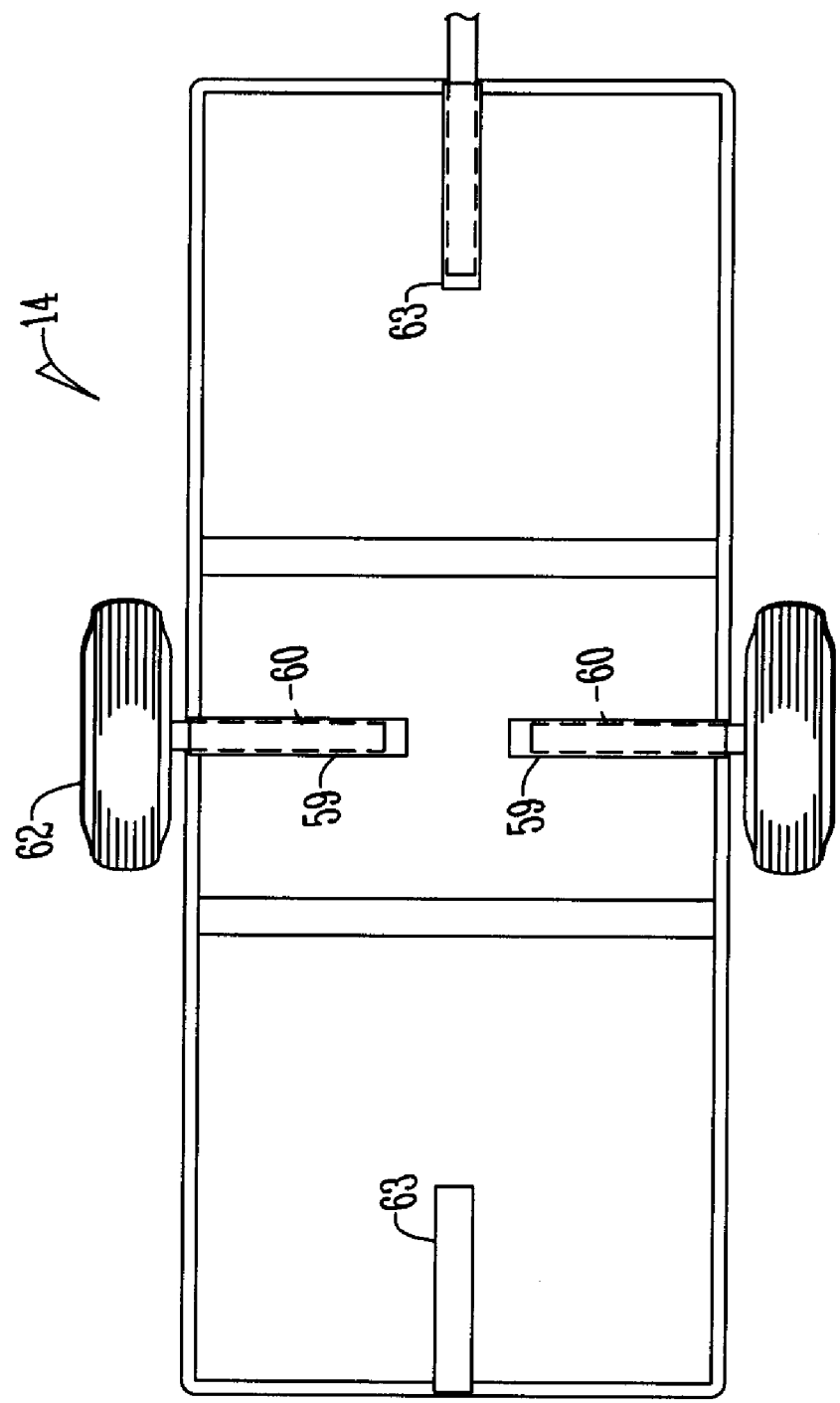
FIG. 5 is a bottom plan view of a trailer member of a recreational trailer assembly.
Figure 6:
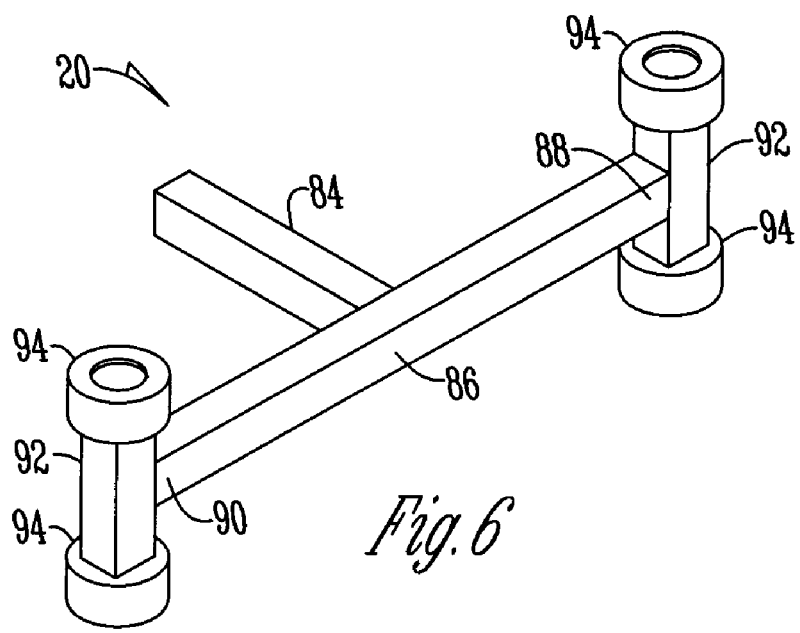
FIG. 6 is a perspective view of a light bar for a recreational trailer assembly.

In this embodiment the centrally located sub-frame member 58 is removed and sub-frame members 59 are positioned in alignment with one another and adjacent the first and second ends 44 and 46 respectfully as best shown in FIG. 5. Each aligned sub-frame member 59 receives an axle 60 that is attached to a wheel 62 such that the axles 60 are rotatably secured within the sub-frame members 59. Transverse sub-frame members 63 are also provided that are aligned in a preferred embodiment perpendicular to the aligned sub-frame members 59 and are of size and shape to receive both the trailer tongue 16, light bar 18 and dolly bar 20 respectfully. As a result the second trailer member 14 may be used as a separate transporting device.

In this embodiment, while preferably the wheels 62 have separate axles 60 other arrangements are contemplated. For example, a single axle that extends the length of the trailer member and having two wheels attached thereto is also contemplated. Other arrangements that result in the placement of the wheels on the second trailer also fall within the scope of this disclosure.

The trailer tongue 16 has an elongated body 64 that extends from a first end 66 to a second end 68. At the first end a connection device 70 is provided. Connection device 70 may be any connection known in the art such as a goose-neck, 5 wheel or the like that allows the recreational trailer assembly 10 to be attached to a vehicle (not shown). At the second end 68 the trailer tongue is removably connected to a frame 34 or 56. In the embodiment of FIG. 2 the trailer tongue 16 has a detachable mechanism 72 that preferably is a tongue latch used in combination with a hitch pin. Specifically the detachable mechanism 72 is secured to a trailer bed 22 or 42 when a pin is placed and aligned with the holes of a tongue latch and within the trailer bed 22 or 42. Preferably pulling torque causes the latch to disengage the hitch pin such that the trailer tongue 16 is still secured to the frame however the trailer itself is able to pivot about an axle 38 or 60.

The trailer tongue 16 also has a leg 74 that carries a wheel 76. When the leg is rotated the wheel 76 contacts the ground. The wheel provides additional support for the recreational trailer assembly 10 and additionally facilitates transportation. Optionally, the trailer tongue can be a ball hitch or other mechanism that allows connection to a vehicle.

The light bar 18 has a generally T-shaped construction. Specifically a first member 78 is secured to a second member 80 wherein the second member 80 is of greater length than the first bar 78. Preferably the first and second members 78 and 80 are perpendicular to one another. The second member 80 has a plurality of lights 82 disposed therein that are actuated electrically through electric wiring (not shown) that may be connected to wiring of the vehicle (not shown). Thus when the second trailer member 14 is disengaged from the first trailer member 12 the light bar 18 can be placed onto the back of the first trailer member 12. Then via electrical connection to the electrical system of a vehicle, illumination of the lights occurs when braking and signaling to warn other drivers of the use the recreational trailer assembly 10. Consequently the first trailer member 12 is able to be used as a cargo carrier.

Figure 7:
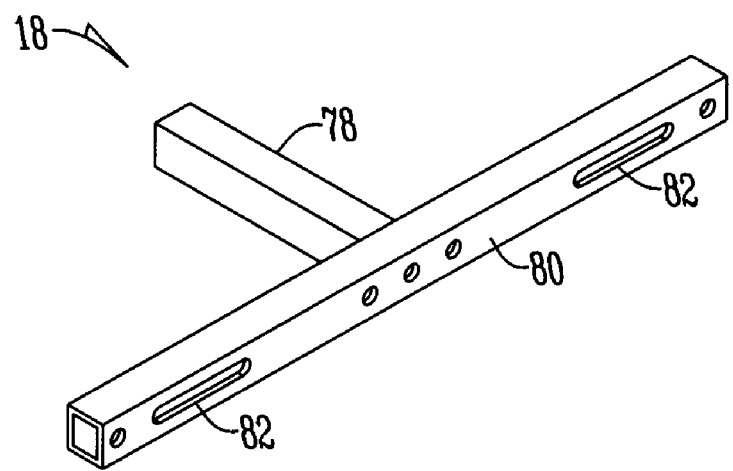
FIG. 7 is a perspective view of a dolly bar for a recreational trailer assembly.

As best shown in FIG. 7 the dolly bar 20 also generally has a T-shaped body having a first member 84 that intersects and is secured to a second member 86. The second member 86 extends from a first end 88 to a second end 90 wherein an axle 92 is secured to each end 88 and 92. Each axle 92 contains wheels 94 such that when the first member 84 is disposed within a sub-frame member of either the first or second trailer members 12 and 14, the trailer members 12 and 14 are automatically provided with the wheels 94 to assist in transportation of the individual pieces.

In operation when an individual desires to haul an ATV, lawn tractor or the like, an individual gathers the first and second trailer members 12 and 14 and trailer tongue 16. The first and second trailer members 12 and 14 are then detachably connected to one another wherein the second end 26 of the first trailer member 12 is detachably secured to the first end 44 of the second trailer member 14. Specifically, a centrally located sub-frame member 58 extends past the first end 44 of the second trailer member 14 into a sub-frame member 36 of the first trailer member 12. Simultaneously, first and second connection mechanisms 30 and 50 interconnect to prove a detachable connection.

The trailer tongue 16 is then attached to the vehicle at a first end 66 and onto the first trailer member 12 at a second end 68. The trailer tongue 16 is then actuated in order to release the first trailer member 12 to allow pivoting about the axle 38. At this time the ATV is driven up the tailgate 52 into the recreational trailer assembly 10 over the beds 22 and 42. Then, optionally the light bar 18 may be detachably connected to the second end 46 of the second trailer member 14 and electrically connected to the vehicle.

After the ATV is unloaded the trailer tongue 16, first trailer member 12, second trailer member 14 and light bar 18 are all detached from one another to facilitate transportation and storage of each. Then if a user desires to haul only smaller items such as luggage, a user can take just the second trailer member 14 and add wheels 62 and trailer tongue 16 thereto in order to provide a smaller more compact carrier.

Once transportation of items is completed the trailer assembly can be broken down into its separate components. At this time the dolly bar may be inserted into either of the first or second trailer members 12 and 14 to facilitate the transportation of the components to a remote storage location.

Thus provided is recreational trailer assembly 10 that is made from a plurality of different components. As a result an individual receives the benefit of having a larger trailer that is able to haul larger items such as ATV's, lawn tractors and the like but yet still easy to transport and store after use. Additionally the recreational trailer assembly 10 is multi-functional as the second trailer member 14 may be used on its own in order to haul smaller items. Additionally the use of the light bar 18 provides lighting for a back end of the recreational trailer assembly 10 to alert other drivers of the presence of the trailer assembly 10. Additionally the dolly bar 20 provides for improved transportation of the individual components of the trailer assembly 10 to storage. Thus at the very least all of the stated objectives have been met.

It will be appreciated by those skilled in the art that other various modifications could be made to the device without the parting from the spirit and scope of this invention. All such modifications and changes fall within the scope of the claims and are intended to be covered thereby.

What is claimed is:

1. A recreational trailer assembly for hauling comprising:
   a first trailer member having a bed extending from a first end to a second end and having an underside having a frame secured thereto;
   a trailer tongue removably connected to and extending from the frame past the first end of the first trailer member for attachment to a vehicle;
   an axle with wheels secured to the frame to facilitate transportation of the first trailer member;
   a second trailer member having a bed extending from a first end to a second end and detachably connected at the first end to the second end of the first trailer member to form the recreational trailer assembly;
   wherein the second trailer member has an underside having a frame secured thereto wherein sub-frame members are positioned in alignment and adjacent the first and second ends for receiving axles with wheels attached thereto.

2. The recreational trailer assembly of claim 1 wherein the second trailer member has an underside having a frame secured thereto that has a centrally located sub-frame member extending from the first end of the second trailer member into a sub-frame member of the frame of the first trailer member to provide a detachable connection.

3. The recreational trailer assembly of claim 1 wherein the first trailer member and the second trailer member each have a sidewall extending around a perimeter wherein a detachable connection between the first and second trailer members is within the sidewall.

4. The recreational trailer assembly of claim 1 wherein the underside of the second trailer has a transverse sub-frame member that is transverse to the sub-frame members positioned in alignment and has an opening for receiving the trailer tongue.

5. The recreational trailer assembly of claim 1 further comprising a T-shaped light bar having at least one light thereon detachably and electrically connected to the second end of the second trailer member.

6. The recreational trailer assembly of claim 1 further comprising a dolly bar having a plurality of wheels detachably connected to the second trailer member to facilitate transportation of the second trailer member when detached from the first trailer member.

* * * * *